United States Patent
Chang et al.

(10) Patent No.: US 10,998,817 B2
(45) Date of Patent: May 4, 2021

(54) AUTO CALIBRATION DEAD-TIME CONTROL CIRCUIT

(71) Applicant: Taiwan Semiconductor Manufacturing Company Limited, Hsinchu (TW)

(72) Inventors: Chia-Chun Chang, Taoyuan County (TW); Alan Roth, Leander, TX (US); Eric Soenen, Austin, TX (US); Tysh-Bin Liu, Hsinchu County (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 456 days.

(21) Appl. No.: 15/860,796

(22) Filed: Jan. 3, 2018

(65) Prior Publication Data
US 2019/0103812 A1    Apr. 4, 2019

Related U.S. Application Data

(60) Provisional application No. 62/565,188, filed on Sep. 29, 2017.

(51) Int. Cl.
| H02M 3/157 | (2006.01) |
| H02M 3/158 | (2006.01) |
| H02M 1/08 | (2006.01) |
| H02M 1/38 | (2007.01) |
| H02M 1/00 | (2006.01) |

(52) U.S. Cl.
CPC .......... *H02M 3/157* (2013.01); *H02M 1/08* (2013.01); *H02M 1/38* (2013.01); *H02M 3/158* (2013.01); *H02M 2001/0009* (2013.01); *H02M 2001/0029* (2013.01)

(58) Field of Classification Search
None
See application file for complete search history.

(56) References Cited

U.S. PATENT DOCUMENTS

| 8,669,790 B2* | 3/2014 | Colombo | ............... H02M 1/08 327/108 |
| 2006/0007713 A1* | 1/2006 | Brown | ............... H02M 3/1588 363/17 |
| 2011/0204866 A1* | 8/2011 | Moon | ............... H02M 3/33523 323/284 |
| 2015/0326121 A1* | 11/2015 | Torres | ............... H02M 3/156 323/271 |

* cited by examiner

Primary Examiner — Jeffrey A Gblende
Assistant Examiner — Henry E Lee, III
(74) Attorney, Agent, or Firm — Jones Day

(57) ABSTRACT

Devices and methods are provided for controlling dead-time of a direct current to direct current (DC-DC) converter. A control circuit includes a first transistor having a source/drain terminal coupled to an output voltage of the DC-DC converter configured to provide current based on the output voltage. The control circuit also includes a digital up/down counter having an output terminal electrically coupled to an input terminal of a delay cell of the DC-DC converter. A current sensing circuit of the control circuit is electrically coupled to an input terminal of the digital up/down counter configured to receive the current and drive the digital up/down counter based on the current.

20 Claims, 8 Drawing Sheets

AUTO CALIBRATION DEAD-TIME CONTROL CIRCUIT

CROSS-REFERENCE TO RELATED APPLICATIONS

This application claims priority to U.S. Provisional Application No. 62/565,188, filed Sep. 29, 2017, entitled "Auto Calibration Dead-Time Control Circuit," which is incorporated herein by reference in its entirety.

FIELD

The technology described in this disclosure relates generally to electronic devices and more particularly to dead-time control circuits.

BACKGROUND

Dead-time control circuits are used for electronic applications where switching control circuitry is desired (e.g., direct current (DC) circuitry). Dead-time control circuits substantially minimize or prevent shoot-through current flow through circuitry by controlling turn on times of the circuitry components.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
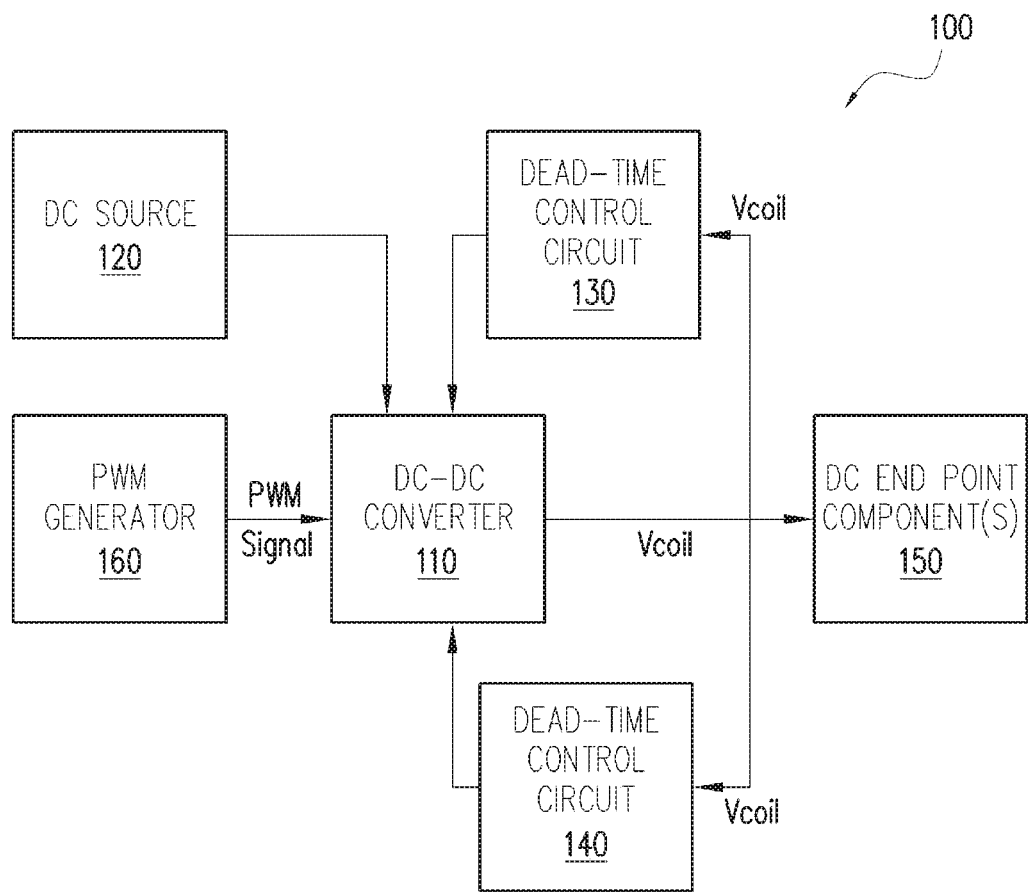
FIG. 1 depicts an example diagram of a system architecture for minimizing dead-time of a DC-DC converter in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Direct current (DC) sources are used in various electrical circuit applications. A battery is an example of a DC power source. However, direct current can be found flowing in other electrical circuit applications, including but not limited to, semiconductors. In some applications, DC sources may provide current and/or voltage that is outside of an input requirement of an end point component(s) that the DC source is connected to. In order to adjust the output of the DC source to an input compatible with an end point component(s), a DC-DC converter can be incorporated into the circuitry. More specifically, a DC-DC converter can adjust a voltage provided by a DC source (e.g., battery) to another DC voltage (e.g., one compatible for its end point component(s)).

DC-DC converters, however, may experience energy loss and/or can damage DC sources due to "dead-time." Dead-time is an amount of time that components within DC-DC converters are non-operational. Lack of operation of components within DC-DC converter can lead to wasted energy (e.g., current is being consumed by the converter but is not being utilized to create operational output voltages). Additionally, dead-time can create a low resistance pathway across the DC source providing the voltage to DC-DC converter. Current tends to travel through the pathway of least resistance and can potentially damage the DC source by traveling back through the DC source as opposed to components within the DC-DC converter.

Dead-time occurs in DC-DC converters due to charging characteristics of various components. Components within DC-DC converters require time to charge or discharge prior to being operational (e.g., in an ON state). In other words, components within the DC-DC converter may not instantaneously transition from an ON state to an OFF state or vice versa. Instead, the components within the DC-DC converter may require ramp up or ramp down time before achieving an ON state or an OFF state. Energy loss and/or DC source damage can occur during this dead-time as the components within the DC-DC converter are in an intermediary charging/discharging state. Dead-time control circuits can be used to minimize or eliminate the dead-time within a DC-DC converter.

FIG. 1 depicts an example diagram of a system architecture 100 for minimizing dead-time of a DC-DC converter 110 in accordance with some embodiments. System architecture 100 includes DC-DC converter 110, DC source 120, one or more dead-time control circuits 130, 140, and DC end point component(s) 150, and pulse width modulation (PWM) generator 160. The DC-DC converter 110 is designed to convert an input DC voltage from the DC source 120 to an expected DC voltage level of the DC end point components 150. DC-DC converter 110 includes one or more components which can contribute to dead-time of the converter due to the charging/discharging time associated with the converter components. Such components will be described further in reference to FIG. 2. In accordance with some embodiments, a PWM signal from PWM generator 160 along with a DC voltage from DC source 120 is provided to DC-DC converter 110 for conversion to another voltage (e.g., $V_{coil}$) that is compatible with an end point component(s) 150. A PWM signal, in one embodiment, is a square wave signal having an amplitude (e.g., maximum voltage) that represents a DC voltage. The PWM signal has a frequency and duty cycle. The frequency determines temporally, how much time it takes for the DC voltage to switch from the amplitude voltage to zero voltage. The PWM signal also has a duty cycle which determines what percentage of the total cycle time the amplitude voltage is provided with respect to a full cycle. For example, a full cycle would be the voltage output starting at zero voltage, rising to an amplitude voltage, and returning back to zero voltage.

Dead-time control circuits 130, 140 can provide controlling signals to DC-DC converter 110 to substantially minimize or eliminate dead-time during the voltage conversion process. The controlling signals open and/or close switches within the DC-DC converter to modify a voltage and current provided to the DC-DC converter components that contribute to dead-time. By modifying the voltage, some components within DC-DC converter 110 are controlled to take longer to charge while others operate at nominal voltages. The delayed component operation allows for components within DC-DC converter 110 to be operational for a longer period of time (e.g., substantially continuous). For example, consider a DC-DC converter having two components. Each component collectively contributes to a total DC output voltage of the DC-DC converter. Having both components synchronized and operating at the same rate would mean the two components would be operational (e.g., ON) at the same time, for a set amount of time, and in a non-operational stated (e.g., OFF) at the same time. The dead-time in this scenario would be at its maximum time as both components would simultaneously be in an OFF state not providing an output voltage. Delaying when one component is operational (e.g., by limiting its input voltage) can lead to that component being non-operational (e.g., OFF) while maintaining the operation of the other component. By staggering when one component is operational and the other is non-operational can provide for a substantially continuous output voltage of the DC-DC converter based on substantially similar operation of the components. The amount of time that both components are non-operational (e.g., both OFF) is minimized by this staggering. Having substantially continuous operation of components within DC-DC converter, the dead-time is substantially minimized or eliminated.

Figure 2:
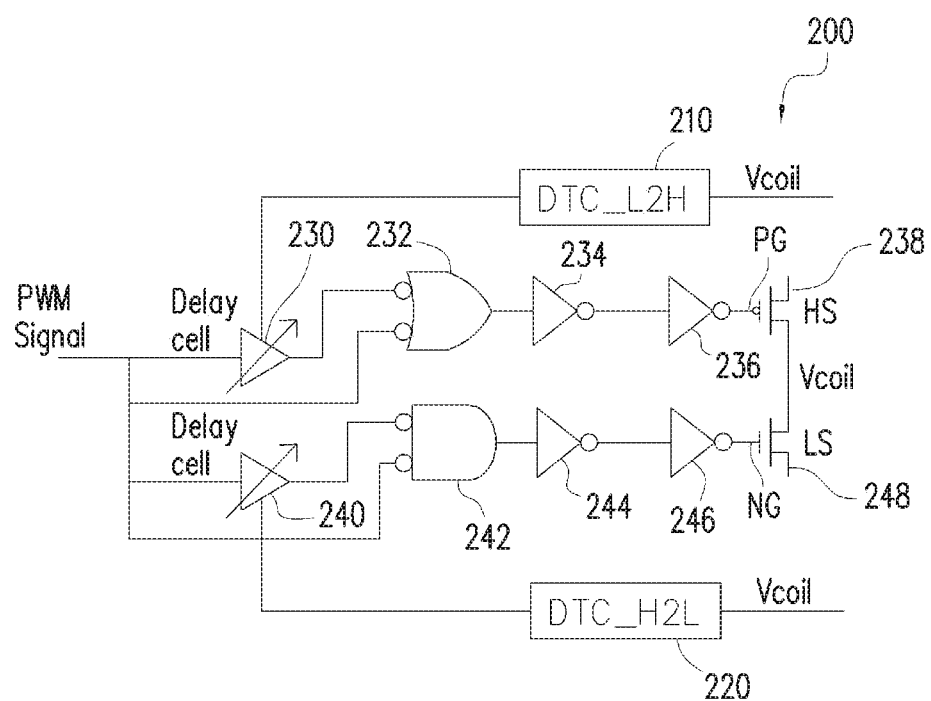
FIG. 2 depicts an example diagram of a controlled DC-DC converter using dead-time control circuits in accordance with some embodiments.

FIG. 2 depicts an example diagram of a controlled DC-DC converter 200 having dead-time control circuits 210, 220 in accordance with some embodiments. In some embodiments, dead-time control circuits 210, 220 are analogous to dead-time control circuits 130, 140. Dead-time control circuits 210, 220 control delay lines of delay cells 230, 240, which will be further described in connection with FIGS. 4 and 6-7. Dead-time control circuits 210, 220 can substantially minimize or eliminate dead-time of DC-DC converters in various operating conditions (e.g., varying temperatures, voltages, currents). Additionally, dead-time control circuits 210, 220 can increase power efficiency of DC-DC converters while occupying a small area due to the circuitry components. Continuously maintaining operations of the DC-DC converter components can also help to create a low resistance pathway for current travel lower than that across the DC source, minimizing or eliminating damage of the DC source.

Referring to FIG. 2, a controlled DC-DC converter 200 includes delay cells 230, 240, logic gates 232, 242, one or more inverters 234, 236, 244, 246, and one or more nMOS transistor 248 and pMOS transistor 238. Controlled DC-DC converter 200 can include components which contribute to dead-time due to the corresponding component charging/discharging time. For example, nMOS transistor 248 cannot instantaneously switch between an ON state and an OFF state. Transistors (e.g., nMOS transistor 248) have corresponding charging times associated with transitioning from an OFF state to an ON state. Similarly, transistors have corresponding discharging times associated with transitioning from an ON state to an OFF state. The time associated with charging and/or discharging of a transistor in order to switch states (e.g., time when the nMOS transistor 248 and pMOS transistor 238 are not in the desired ON or OFF state for optimum converter 200 function) contributes to dead-time of the DC-DC converter.

In accordance with some embodiments, a PWM signal and DC voltage are provided to the controlled DC-DC converter 200 from a PWM generator (e.g., PWM generator 160) and a DC source (e.g., DC source 120), respectively. The controlled DC-DC converter 200 can provide an output voltage, $V_{coil}$, that is based on outputs from high side (HS) circuitry and low side (LS) circuitry. For example, HS circuitry of a controlled DC-DC converter 200 can include delay cell 230, logic gate 232, inverters 234, 236, and pMOS transistor 238. Logic gate 232 receives two instances of the PWM signal as input. At one input to logic gate 232, a PWM signal is received. At a second input to logic gate 232, an output of delay cell 230 is provided. Delay cell 230 receives a PWM signal and may modify and/or temporarily delay the PWM signal, as described further in FIG. 7, prior to providing an output to logic gate 232. In some embodiments, PWM signal input into logic gate 232 may remain unmodified or substantially similar to the PWM signal. In accordance with some implementations, delay cells 230 is preset to provide a maximum delay of the PWM signal. The output of the logic gate 232 is electrically coupled to two inverters 234, 236 coupled together in series. An output of inverter 236 is electrically coupled to a gate terminal of pMOS transistor 238.

LS circuitry of a controlled DC-DC converter 200 can include delay cell 240, logic gate 242, one or more inverters 244, 246, and nMOS transistor 248. Logic gate 242 receives two instances of the PWM signal. At one input to logic gate 242, a PWM signal is received. At a second input to logic gate 242, an output of delay cell 240 is provided. Delay cell 240 receives a PWM signal and may modify and/or temporarily delay the PWM signal, as described further in FIG. 7, prior to providing an output to logic gate 242. In some embodiments, PWM signal input into logic gate 242 may remain unmodified or substantially similar to the PWM signal. In accordance with some implementations, delay cell 240 is preset to provide a maximum delay to the PWM signal. The output of the logic gate 242 is electrically coupled to two inverters 244, 246 coupled together in series. An output of inverter 246 is electrically coupled to a gate terminal of nMOS transistor 248. A source/drain terminal of pMOS transistor 238 is electrically coupled to a source/drain terminal of nMOS transistor 248 and provides an output voltage, $V_{coil}$, of the controlled DC-DC converter 200. The output voltage, $V_{coil}$, can be provided as input to dead-time control circuits 210, 220. Dead-time control circuits 210, 220 can in turn drive delay cells 230, 240 as described further in FIG. 7.

Figure 3:
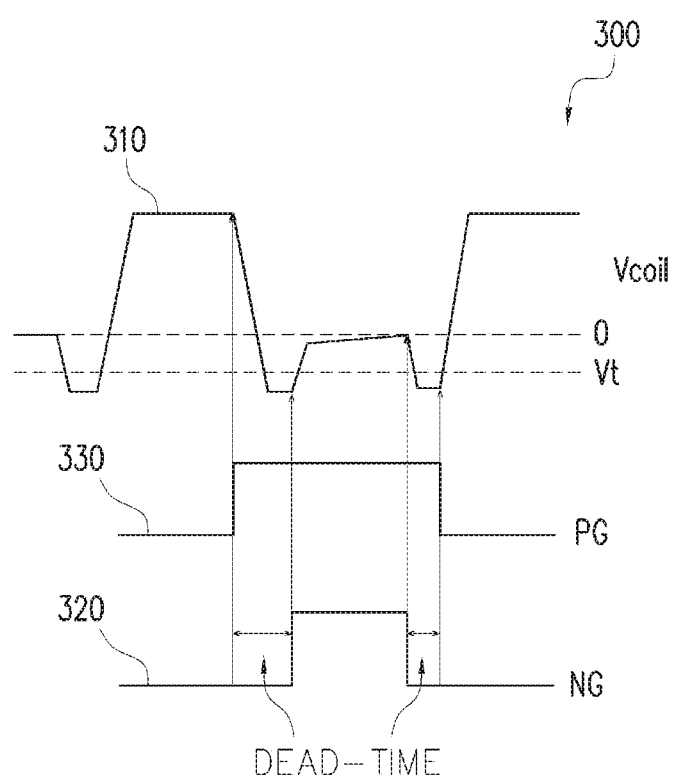
FIG. 3 depicts an example diagram of an output voltage waveform of a DC-DC converter as shown in FIG. 2 and corresponding signal waveforms in accordance with some embodiments.

FIG. 3 depicts an example diagram 300 of an output voltage waveform 310 of a controlled DC-DC converter 200 as shown in FIG. 2 and corresponding signal waveforms 320, 330 (e.g., NG and PG of FIG. 2, respectively) in accordance with some embodiments. As illustrated by output waveform 310, output voltage, $V_{coil}$, of FIG. 2 can switch between a number of voltages crossing a body diode threshold voltage, $V_t$, and zero. As illustrated by corresponding signal waveforms 320, 330 (e.g., NG and PG of FIG. 2), output voltage, $V_{coil}$, is less than a body diode threshold voltage, $V_t$, when PG 330 is high and NG 320 is low. Alternatively, output voltage, $V_{coil}$, is greater than a voltage threshold, $V_t$, when PG 330 is low or NG 320 is high.

Figure 4:
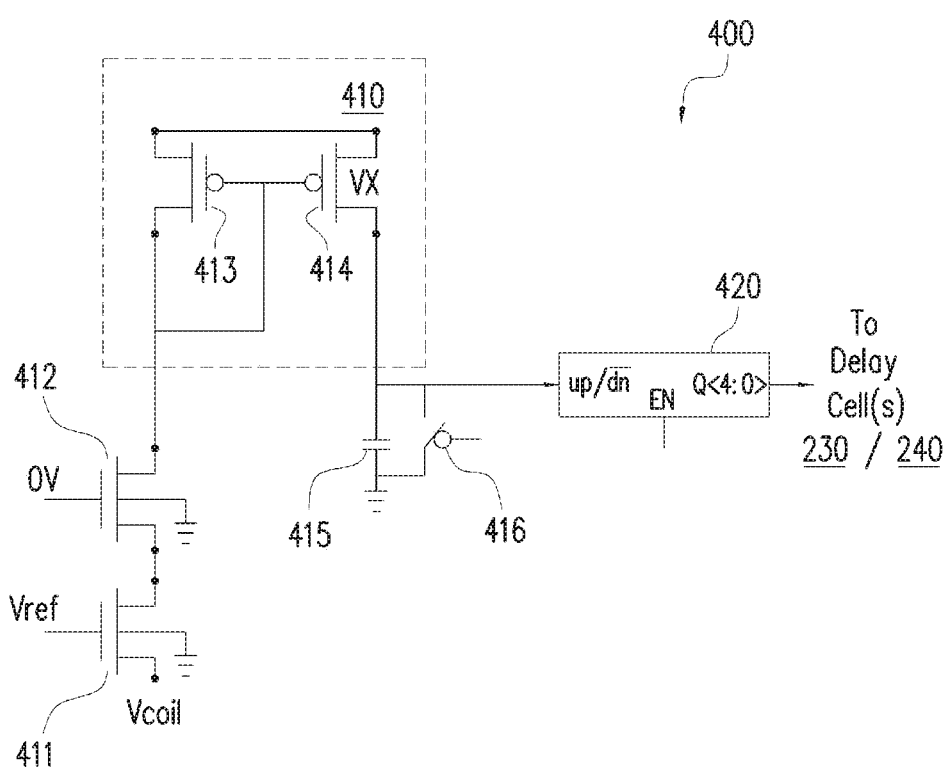
FIG. 4 depicts an example diagram of an auto-calibrated dead-time control circuit in accordance with some embodiments.

FIG. 4 depicts an example diagram of an auto-calibrated dead-time control circuit 400 in accordance with some embodiments. Auto-calibrated dead-time control circuit 400 can be used, for example, as an implementation of one or more of dead-time control circuits 210, 220 of FIG. 2. In accordance with some embodiments, auto-calibrated dead-time control circuit 400 includes one or more transistors (e.g., nMOS transistors 411, 412), a current sensing circuit 410, one or more capacitors (e.g., capacitor 415), one or more switches (e.g., switch 416), and a digital up/down counter 420. An output of the digital up/down counter 420, in accordance with some embodiments, is provided as an input into one or more delay cell(s) 230, 240. A source/drain terminal of nMOS 411 is electrically coupled to the controlled DC-DC converter 200 output voltage, $V_{coil}$. Connection to the output voltage, $V_{coil}$, provides for auto-calibration of controlled DC-DC converter 200 through continuous, real-time voltage measurements (e.g., dynamically updated). The gate of nMOS transistor 411 is electrically coupled to a reference voltage, $V_{ref}$. Another source/drain terminal of nMOS transistor 411 is coupled to a source/drain terminal of nMOS transistor 412. The gate terminal of nMOS transistor 412 is electrically coupled to a voltage source having minimal or no voltage (e.g., 0 V) applied.

In accordance with some embodiments, current sensing circuit 410 includes pMOS transistors 413, 414. A source/drain terminal of nMOS transistor 412 is electrically coupled to the gate terminals of pMOS transistors 413, 414 and a source/drain terminal of pMOS transistor 413. The gate terminals of pMOS transistors 413, 414 are electrically coupled to one another. Another source/drain terminal of pMOS transistor 413 is electrically coupled to a source drain terminal of pMOS transistor 414. Another source/drain terminal of pMOS transistor 414 is electrically coupled to capacitor 415. Capacitor 415 is electrically coupled in parallel to a switch 416. One node of the parallel connection of capacitor 415 and switch 416 is electrically coupled to an input of digital up/down counter 420. Another node of the parallel connection of capacitor 415 and switch 416 is electrically coupled to ground.

Clamping nMOS transistor 411 with the reference voltage, $V_{ref}$ (e.g., ~0.7V), can protect the nMOS transistor 412 from electrical damage (e.g., voltage, current). When the pMOS transistor 238 (e.g., high side HS) of the controlled DC-DC converter 200 and the nMOS transistor 248 (e.g., low side LS) of the controlled DC-DC converter 200 are both in an OFF state (e.g., PG 330 is high and NG 320 is low), the body diode will force to an ON state and the output voltage, $V_{coil}$, is less than approximately −0.7V. With the output voltage, $V_{coil}$, less than approximately −0.7V, nMOS transistor 411, 412 of auto-calibrated dead-time control circuit 400 is in an ON state. With nMOS transistor 411, 412 in an ON state, current will travel through nMOS transistor 412 and pMOS transistor 413, 414 to produce a mirror current at node $V_x$. The mirror current charges capacitor 415 and switch 416 remains in an open state. With capacitor 415 charged, an input signal into up/down converter 420 will trigger an output of up/down converter 420 to step down the delay cell. Such an output will decrease the delay time of next cycle of the controlled DC-DC converter 200 so as to substantially minimize or eliminate dead-time from the controlled DC-DC converter 200.

When the output voltage, $V_{coil}$, is greater than approximately −0.7V, including a zero voltage, nMOS transistor 412 is in an OFF state. Switch 416 is in a closed state, shorting capacitor 415. Capacitor 415 will not charge when switch 416 is in the closed state. The signal provided to digital up/down counter 420 with switch 416 closed indicates that the output of digital up/down counter 420 should either be increased or maintained (e.g., increase or maintain the dead-time of controlled DC-DC converter 200).

Figure 5:
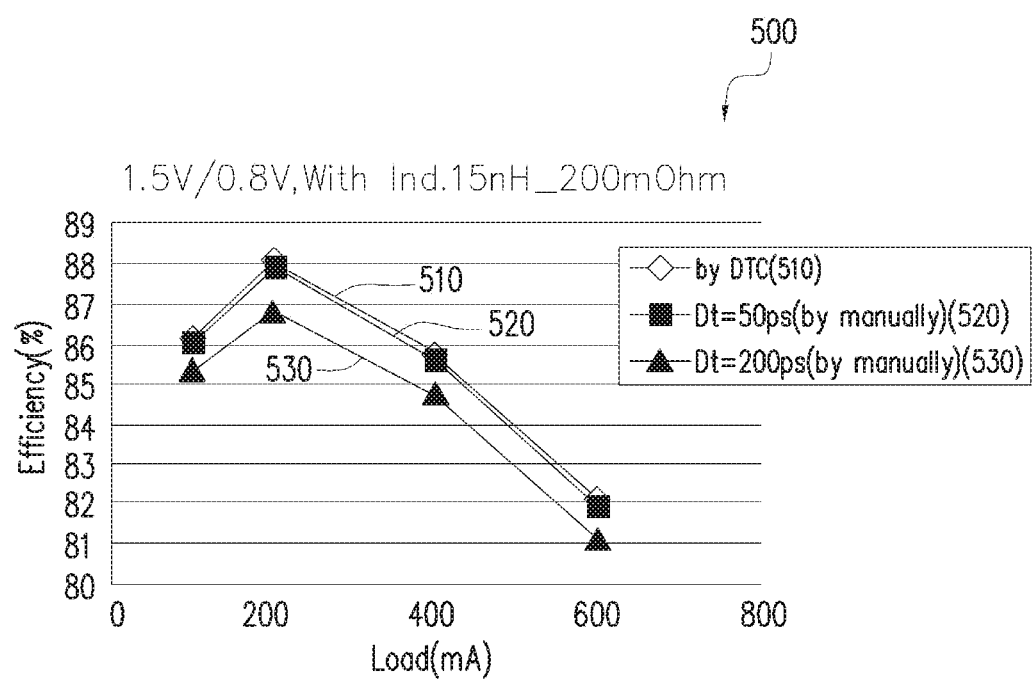
FIG. 5 depicts an example diagram of a dead-time efficiency plot of a controlled DC-DC converter using various embodiments of dead-time control circuitry.

FIG. 5 depicts an example diagram of a dead-time efficiency plot 500 of a controlled DC-DC converter 200 using various embodiments of dead-time control circuitry (e.g., auto-calibrated dead-time control circuit 400). Plot line 510 illustrates a current load (e.g., 0-800 mA) versus efficiency (e.g., 80-89%) plot of dead-time resulting from auto-calibrated dead-time control circuit 400 in place of dead-time control circuits 210, 220 within controlled DC-DC converter 200. Plot line 520 illustrates a current load (e.g., 0-800 mA) versus efficiency (e.g., 80-89%) plot resulting from manual delay of delay cells 230, 240 within controlled DC-DC converter 200 (e.g., in place of using dead-time control circuits 210, 220) by approximately 50 ps. Plot line 530 illustrates a current load (e.g., 0-800 mA) versus efficiency (e.g., 80-89%) plot resulting from manual delay of delay cells 230, 240 within controlled DC-DC converter 200 (e.g., in place of using dead-time control circuits 210, 220) by approximately 200 ps. As illustrated by dead-time efficiency plot 500, plot line 510 has a peak efficiency of about 88% with a load of approximately 200 mA. Plot line 520 has a peak efficiency of about 87.8% with a current load of approximately 200 mA. Plot line 530 has a peak efficiency, as illustrated by plot 500, of about 86.7% with a load of approximately 200 mA. Accordingly, the peak efficiency of dead-time control circuit 400, in some embodiments, for a current load of approximately 200 mA is greater than manually delaying delay cells 230, 240. Similarly, with a current load of approximately 400 mA, plot line 510 has a corresponding efficiency of about 86.9% which is greater than the efficiency of plot lines 520, 530 having corresponding efficiencies of about 86.8% and 84.8%, respectively. With a current load of approximately 100 mA, the efficiency levels of manual delay of delay cells 230, 240 by approximately 50 ps (e.g., plot line 520) and auto-calibrated dead-time control circuit 400 (plot line 510) appear to have about the same efficiency of 86%. In this example, the efficiency of plot lines 510, 520 exceeds that of manually delaying delay cells 230, 240 by approximately 200 ps (e.g., plot line 530) having a corresponding efficiency of about 85.2%. As illustrated by plot 500, using auto-calibrated dead-time control circuit 400 results in an increased efficiency, in many cases, than that of manually delaying delay cells 230, 240 in various current load conditions. Such increased efficiency results from the auto-calibrated delay injected into delay cells 230, 240 by dead-time control circuit 210, 240 based on the continuous, real time voltage output of controlled DC-DC converter 200 (e.g., auto-calibrated dead-time control circuit 400, auto-calibrated dead-time control circuit 600).

Figure 6:
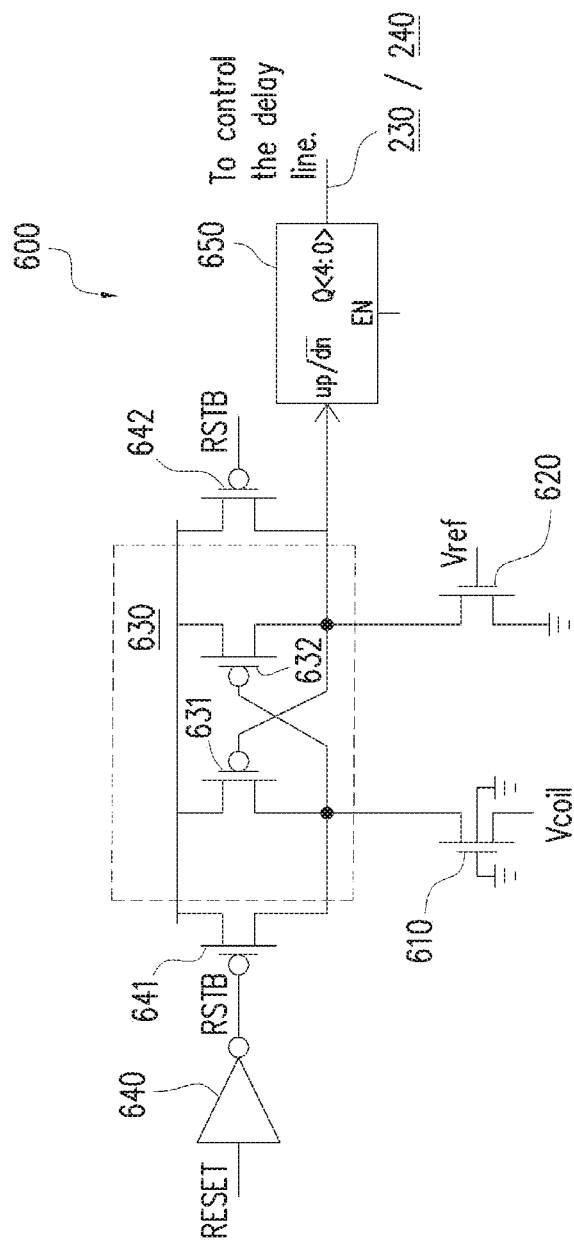
FIG. 6 depicts another example diagram of an auto-calibrated dead-time control circuit in accordance with some embodiments.

FIG. 6 depicts another example diagram of an auto-calibrated dead-time control circuit 600 in accordance with some embodiments. Auto-calibrated dead-time control circuit 600 can be used, in accordance with some embodiments, as implementations of one or more of dead-time control circuits 210, 220 of FIG. 2. Auto-calibrated dead-time control circuit 600 includes nMOS transistors 610, 620, current sensing circuitry 630, reset switching pMOS transistors 641, 642, reset inverter 640, and digital up/down counter 650. Dead-time control circuit 600 compares an output voltage, $V_{coil}$, of a controlled DC-DC converter 200 with a reference voltage, $V_{ref}$. In some embodiments, the reference voltage, $V_{ref}$, is set to a forward voltage of the body diode (e.g., ~0.7V). Based on the comparison of the output voltage, $V_{coil}$, and reference voltage, $V_{ref}$, the digital up/down converter 650 is charged to a voltage, $V_{DD}$. The output of the digital up/down converter 650 provides an input signal to control one or more delay cells 230, 240.

The output voltage, $V_{coil}$, is electrically coupled to a source/drain terminal of nMOS transistor 610. The gate terminal of nMOS transistor 610 is grounded in order to provide nMOS transistor 610 with electrical protection (e.g., voltage protection, current protection). Another source/drain terminal of nMOS transistor 610 is electrically coupled to current sensing circuit 630 (e.g., cross-coupled pMOS transistors 631, 632). A gate terminal of pMOS transistor 632 is electrically coupled to a source/drain terminal of nMOS transistor 610 and a source/drain terminal of pMOS transistor 631. Another source/drain terminal of pMOS transistor 631 is electrically coupled to a source/drain terminal of pMOS transistor 632. Another source/drain terminal of pMOS transistor 632 is electrically coupled to the gate terminal of pMOS transistor 631 and a source/drain terminal of nMOS transistor 620. Another source/drain terminal of nMOS transistor 620 is electrically coupled to ground. The gate terminal of nMOS transistor 620 is electrically coupled to a reference voltage, $V_{ref}$.

The current sensing circuit 630 is controlled by reset pMOS transistors 641, 642. Reset pMOS transistors are controlled via an input signal (e.g., RSTB) connected to the gate terminals of each pMOS transistor. Reset inverter 640 controls the input signal by resetting the voltage of the pMOS transistors 641, 642 to a voltage, $V_{DD}$, on each RESET cycle. When the input signal (e.g., RSTB) is low (e.g., 0), pMOS transistors 631, 632 are in an ON state. A high voltage is present at the input to the digital up/down counter 650 and the digital up/down counter 650 is reset. When the input signal (e.g., RSTB) is high (e.g., 1), pMOS transistors 631, 632 are in an OFF state. A comparison between nMOS transistor 610 (e.g., output voltage $V_{coil}$) and nMOS transistor 620 (e.g., reference voltage $V_{ref}$) is provided to digital up/down counter 650. The output of digital up/down counter 650 determines a delay period, if any, by providing an input to delay cell 230 and/or delay cell 240. The delay period determines whether signals to or within the controlled DC-DC converter 200 are delayed so as to modify the dead-time.

Figure 7:
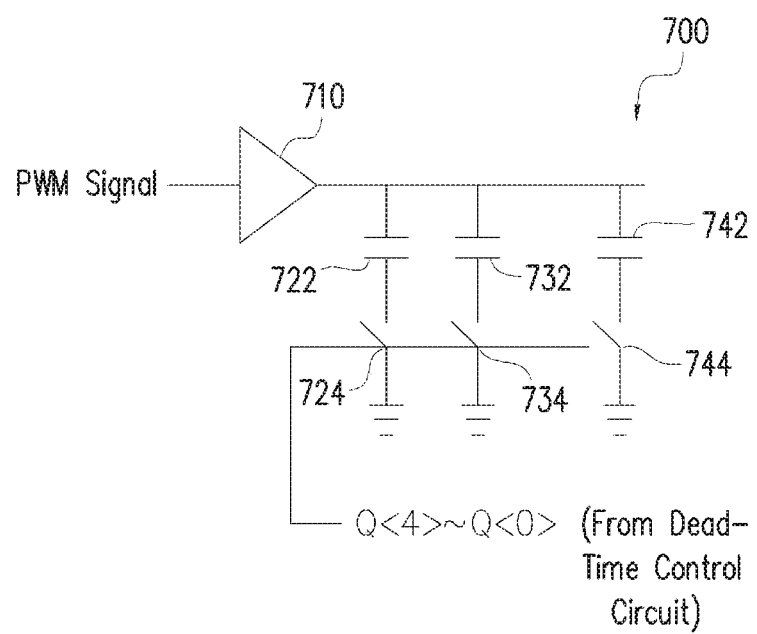
FIG. 7 depicts an example diagram of a delay cell in accordance with some embodiments.

FIG. 7 depicts an example diagram of a delay cell 700 in accordance with some embodiments. Delay cell 700 includes amplifier 710, one or more capacitors 722, 732, 742, and one or more switches 724, 734, 744. Amplifier 710 can receive a PWM signal for input as previously discussed in FIG. 2. The output of amplifier 710 is provided to charge one or more capacitors 722, 732, 742 or as directed output from delay cell 700 based on the connection of the capacitors 722, 732, 742 to ground. The connection of each capacitor 722, 732, 742 with ground in based on an input delay signal (e.g., <4>~Q<0>) provided by a dead-time circuit (e.g., auto-calibrated dead-time control circuit 210, 220, 400, 600). For example, if delay cell 700 is preset to provide a maximum delay, switches 724, 734, 744 are closed. With switches 724, 734, 744 closed, the output of amplifier 710 charges capacitors 722, 732, 742. Capacitors, similar to transistors, have associated charging/discharging times. As a result, the voltage output of delay cell 700 is lower than the output directly from amplifier 710. The lower voltage output will in turn increase a delay in the operation of the corresponding circuitry delay cell 700 is connected to (e.g., LS circuitry, HS circuitry of DC-DC converter).

Switches 724, 734, 744, in accordance with some embodiments, are controlled by the output of a digital up/down counter (e.g., digital up/down counter 420, digital up/down counter 650). Based on the count provided by the digital up/down counter for the address locations corresponding to switches 724, 734, 744, the switches are either opened or closed. A maximum delay time of delay cell 700 slows the rate at which the corresponding LS circuitry or HS circuitry receives voltage and current. The more closed switches, the lower the output voltage of delay cell 700. A lower output voltage of delay cell 700 results in a longer charge time of transistors within the LS circuitry or HS circuity (e.g., transistors 238, 248), increasing the delay time of component operation. Alternatively, a minimum delay time of delay cell 700 is provided when switches 724, 734, 744 are in an open state. With switches 724, 734, 744 open, capacitors 722, 732, 742 are floating (e.g., not connected to ground) and do not charge. The voltage output of amplifier 710, in this example, is the output of delay cell 700 which is provided to the corresponding LS circuitry or HS circuitry. In comparison to the maximum delay (e.g., switches 724, 734, 744 closed), the delay time is decreased and the rate at which nMOS transistor 234 and/or nMOS transistor 248 charges is faster than if delay cell 700 was operating with maximum delay.

Figure 8:
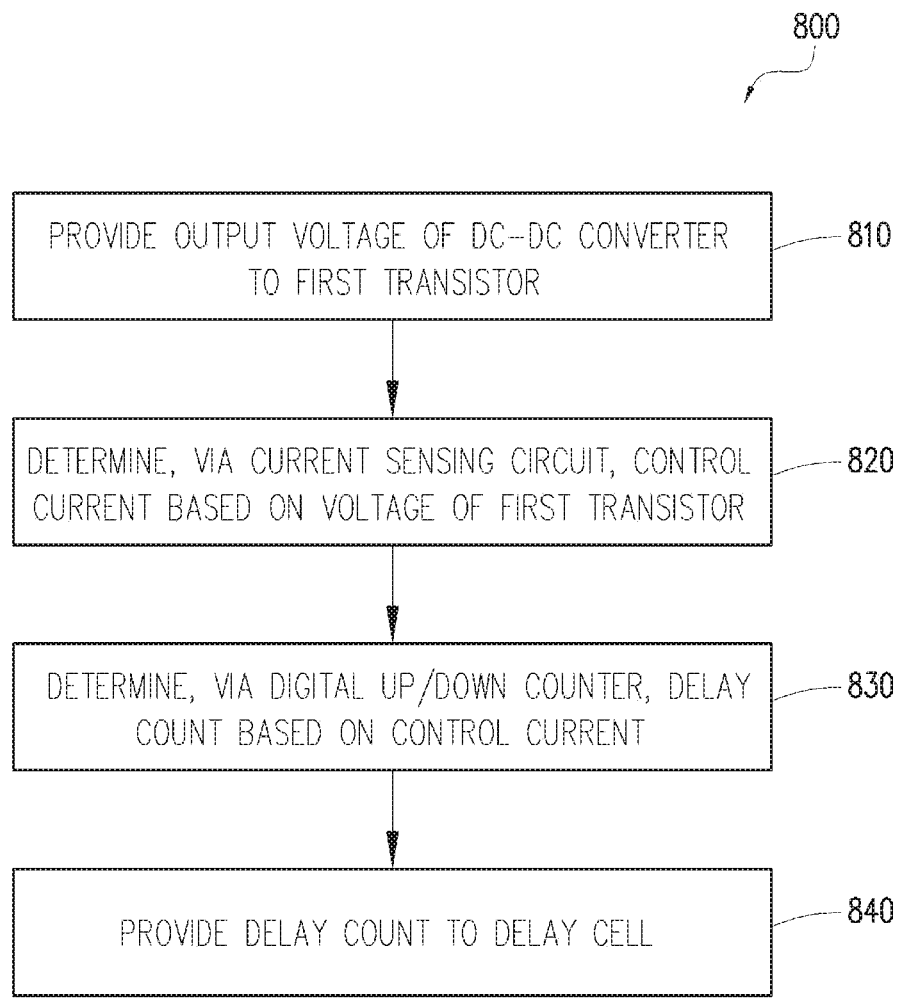
FIG. 8 depicts an example flow diagram depicting a process for auto calibration of a dead-time control circuit in accordance with some embodiments.

FIG. 8 depicts an example flow diagram 800 depicting a process for auto calibration of a dead-time control circuit in accordance with some embodiments. While the process of FIG. 8 is applicable to many different structures, it is described with reference to structures of FIGS. 1, 2, 4, and 6-7 for ease of understanding. Dead-time of a controlled DC-DC converter 200 can be controlled by providing an output voltage of a controlled DC-DC converter 200 to a first transistor at 810. Using a current sensing circuit, a control current is determined at 820 based on a voltage of the first transistor. Using a digital up/down counter, a delay count is determined at 830 based on the control current. The delay count is provided at 840 to a delay cell. In accordance with some embodiments, current is provided to a second transistor electrically coupled between the first transistor and the current sensing circuit having a gate terminal clamped at approximately zero volts. Based on the control circuit, a capacitor is charged. The capacitor is electrically coupled between the current sensing circuit and the input terminal of the digital up/down counter. In accordance with some embodiments, a switch electrically coupled in parallel with the capacitor is closed based on the control current. Current is provided, in accordance with some embodiments, to a second transistor electrically coupled to the current sensing circuit, a gate terminal of the second transistor is electrically coupled to a reference voltage.

Systems and methods as described herein can offers auto-calibrated dead-time control circuits (e.g., dead-time control circuit 400, dead-time control circuit 600) having improved performance. By utilizing digital up/down counters and current sending circuitry, the performance improvement is enabled by substantially minimizing or eliminating dead-time of the DC-DC converter. The auto-calibrated dead-time control circuits described herein utilize a digital up/down counter and current sensing circuitry to continuously monitor and analyze the output voltage, $V_{coil}$, of a DC-DC converter (e.g., DC-DC converter 120, controlled DC-DC converter 200). Using a real-time output voltage (e.g., $V_{coil}$), the dead-time control circuits can control the low-side and high-side circuitry of the DC-DC converter to either increase, decrease, or maintain a delay time for the respective circuitry. Such delay can decrease the dead-time in the circuit as components within the DC-DC converter can be always in an ON state while the other components are charging or discharging and continuously providing an output voltage, $V_{coil}$. As illustrated in FIG. 5, the use of auto-calibrated dead-time control circuits can produce a higher efficiency than manually delaying the components within the DC-DC converter.

In one embodiment, a control circuit for controlling dead-time of a DC-DC converter includes a first transistor comprising a source/drain terminal coupled to an output voltage of the DC-DC converter configured to provide current based on the output voltage. The control circuit also includes a digital up/down counter including an output terminal electrically coupled to an input terminal of a delay cell of the DC-DC converter. Additionally, the control circuit includes a current sensing circuit electrically coupled to an input terminal of the digital up/down counter configured to receive the current and drive the digital up/down counter based on the current.

In another embodiment, a method for controlling dead-time of a DC-DC converter includes providing an output voltage of a DC-DC converter to a first transistor. A control current is determined, via a current sensing circuit based on a voltage of the first transistor. A delay count is determined, via a digital up/down counter, based on the control current. The delay count is provided to the delay cell.

In yet another embodiment, a DC-DC circuit includes one or more delay cells, a control circuit including an output electrically coupled to an input of the one or more delay cells configured to control the one or more delay cells, and a high side circuit and a low side circuit coupled to the one or more delay cells and configured to provide an output voltage. The high side circuit and the low side circuit both include a logic gate, one or more inverters, and a transistor. The logic gate, the one or more inverters, and the transistor are electrically coupled together in series.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A control circuit for controlling dead-time of a direct current to direct current (DC-DC) converter, the control circuit comprising:
a first transistor comprising a source/drain terminal coupled to an output voltage of the DC-DC converter configured to provide current based on the output voltage;
a digital up/down counter comprising an output terminal electrically coupled to an input terminal of a delay cell of the DC-DC converter;
a current sensing circuit electrically coupled to an input terminal of the digital up/down counter configured to receive the current and drive the digital up/down counter based on the current;
a second transistor electrically coupled to the current sensing circuit, a gate terminal of the second transistor is electrically coupled to a reference voltage; and
a capacitor electrically coupled between the current sensing circuit and the input terminal of the digital up/down counter.

2. The control circuit of claim 1, wherein
the first transistor is configured to be operational based on a comparison between the output voltage and a gate voltage of the first transistor,
the current sensing circuit is further configured to either modify or maintain a count of the digital up/down counter, and
the digital up/down counter modifies or maintains a delay time of the delay cell to minimize or eliminate the dead-time of the DC-DC converter.

3. The control circuit of claim 1, further comprising a switch electrically coupled in parallel with the capacitor.

4. The control circuit of claim 1, wherein the current sensing circuit comprises:
a third transistor and a fourth transistor electrically coupled to each other via a gate terminal and a source/drain terminal of each transistor,
wherein the third transistor is electrically coupled between the second transistor and the fourth transistor via the gate terminal of the third transistor and a source/drain terminal of the second transistor.

5. The control circuit of claim 1, wherein a gate terminal of the first transistor is electrically coupled to a reference voltage.

6. The control circuit of claim 1, wherein the current sensing circuit comprises:
a third transistor and a fourth transistor cross coupled between the first transistor and the second transistor, wherein:
a source/drain terminal of the second transistor is electrically coupled to a source/drain terminal of the fourth transistor and a gate terminal of the third transistor, and
another source/drain terminal of the first transistor is electrically coupled to a source/drain terminal of the third transistor and a gate terminal of the fourth transistor.

7. The control circuit of claim 6, further comprising:
a first reset transistor electrically coupled in parallel with the third transistor;
a second reset transistor electrically coupled in parallel with the fourth transistor; and
a reset inverter electrically coupled to gate terminals of each reset transistor.

8. The control circuit of claim 1, wherein a gate terminal of the first transistor is electrically coupled to ground.

9. A method for controlling dead-time of a direct current to direct current (DC-DC) converter, the method comprising:
providing an output voltage of a DC-DC converter to a first transistor;
determining, via a current sensing circuit, a control current based on a voltage of the first transistor;

providing current to a second transistor electrically coupled to the current sensing circuit, a gate terminal of the second transistor is electrically coupled to a reference voltage;

determining, via a digital up/down counter, a delay count based on the control current;

providing the delay count to a delay cell; and charging, based on the control current, a capacitor electrically coupled between the current sensing circuit and an input terminal of the digital up/down counter.

10. The method of claim 9, further comprising closing a switch electrically coupled in parallel with the capacitor based on the control current.

11. The method of claim 9, wherein the current sensing circuit comprises:

a third transistor and a fourth transistor electrically coupled to each other via a gate terminal and a source/drain terminal of each transistor, wherein the third transistor is electrically coupled between the second transistor and the fourth transistor via the gate terminal of the third transistor and a source/drain terminal of the second transistor.

12. The method of claim 9, wherein a gate terminal of the first transistor is electrically coupled to a reference voltage.

13. The method of claim 9, wherein the current sensing circuit comprises:

a third transistor and a fourth transistor cross coupled between the first transistor and the second transistor, wherein:

a source/drain terminal of the second transistor is electrically coupled to a source/drain terminal of the fourth transistor and a gate terminal of the third transistor, and another source/drain terminal of the first transistor is electrically coupled to a source/drain terminal of the third transistor and a gate terminal of the fourth transistor.

14. The method of claim 9, wherein the current sensing circuit further comprises:

a first reset transistor electrically coupled in parallel with the third transistor;

a second reset transistor electrically coupled in parallel with the fourth transistor; and a reset inverter electrically coupled to gate terminals of each reset transistor.

15. The method of claim 9, wherein a gate terminal of the first transistor is electrically coupled to ground.

16. A direct current to direct current (DC-DC) circuit comprising:

one or more delay cells;

a control circuit comprising a current sensing circuit, a transistor, and a digital up/down counter;

the control circuit further comprising an output electrically coupled to an input of the one or more delay cells; and a high side circuit and a low side circuit coupled to the one or more delay cells and configured to provide an output voltage, the high side circuit and the low side circuit each circuit comprising: a logic gate, one or more inverters, and a transistor;

wherein:

the logic gate, the one or more inverters, and the transistor are electrically coupled together in series;

the transistor is configured to be operational based on a comparison between the output voltage and a gate voltage of the transistor;

the current sensing circuit is configured to either modify or maintain a count of the digital up/down counter; and the digital up/down counter modifies or maintains a delay time of the one or more delay cells to minimize or eliminate the dead-time of the DC-DC circuit.

17. The control circuit of claim 1, wherein the second transistor is electrically coupled between the first transistor and the current sensing circuit; and the gate terminal of the second transistor is clamped at approximately zero volts.

18. The method of claim 9, wherein the second transistor is electrically coupled between the first transistor and the current sensing circuit; and the gate terminal of the second transistor is clamped at approximately zero volts.

19. The DC-DC circuit of claim 16, further comprising a capacitor electrically coupled between the current sensing circuit and an input terminal of the digital up/down counter.

20. The DC-DC circuit of claim 19, further comprising a switch electrically coupled in parallel with the capacitor.

* * * * *